April 11, 1939.  C. J. SMITH  2,154,113

MOTOR VEHICLE

Filed Dec. 29, 1934

Inventor
CHARLES J. SMITH
By Tibbetts & Hart
Attorneys

Patented Apr. 11, 1939

2,154,113

UNITED STATES PATENT OFFICE 2,154,113

MOTOR VEHICLE

Charles J. Smith, Detroit, Mich., assignor to Packard Motor Car Company, Detroit, Mich., a corporation of Michigan Application December 29, 1934, Serial No. 759,724

4 Claims. (Cl. 220—44)

This invention relates to closure means and more particularly to closure means for the filler necks of motor vehicle fuel tanks.

In some types of fuel feeding systems for motor vehicles the fuel tank must have communication with atmosphere in order that vacuum can be provided and excessive pressure relieved. It is customary to provide a vent in the cover for the tank filler neck to connect such systems with atmosphere. In some instances the filler necks are short or they extend so that their outer ends are a short distance above the tank with which they are associated. Under such circumstances fluid fuel often splashes out of the vented closure means when vehicles travel over uneven road surfaces or are tilted during changes in direction of travel. This loss of fuel is undesirable because of the waste and the fire hazard created.

An object of the invention is to overcome the above mentioned objectionable feature in a vented fuel feeding system.

Another object of the invention is to provide a vented tank closure structure with means restricting the outflow of liquid fuel therefrom.

A further object of the invention is to provide a vented closure structure for the filler neck of a liquid fuel tank with valve means to restrict the out-flow of liquid fuel through the vent.

Other objects of the invention will appear from the following description taken in connection with the drawing, which forms a part of this specification, and in which.

Figure 1:
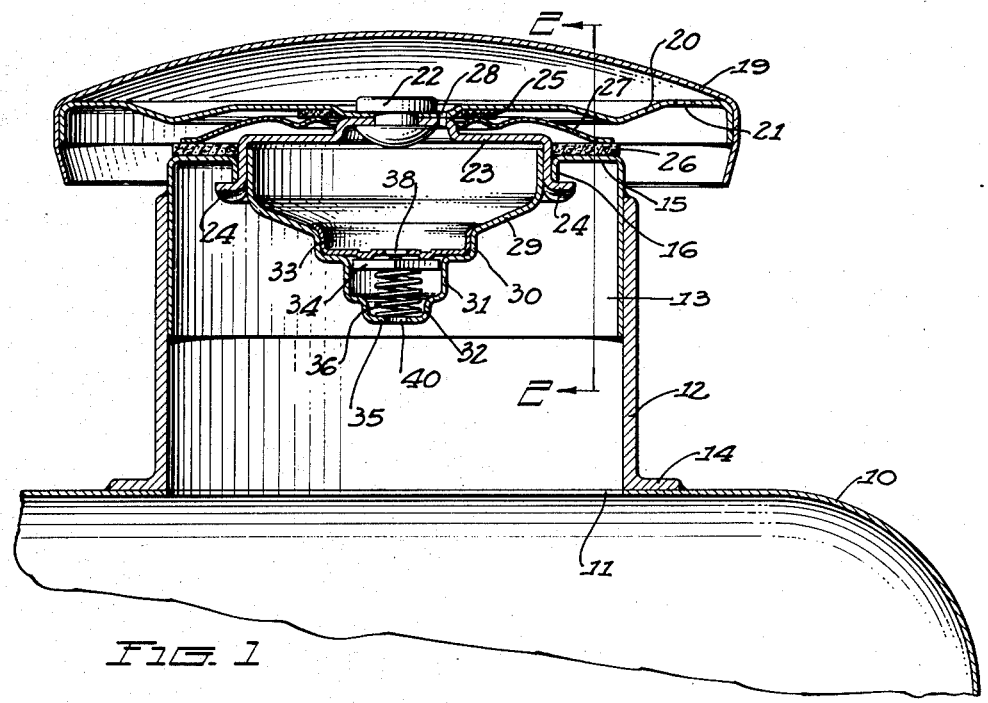
Fig. 1 is a fragmentary vertical section of a motor vehicle fuel feeding system having my invention incorporated therein.
Figure 2:
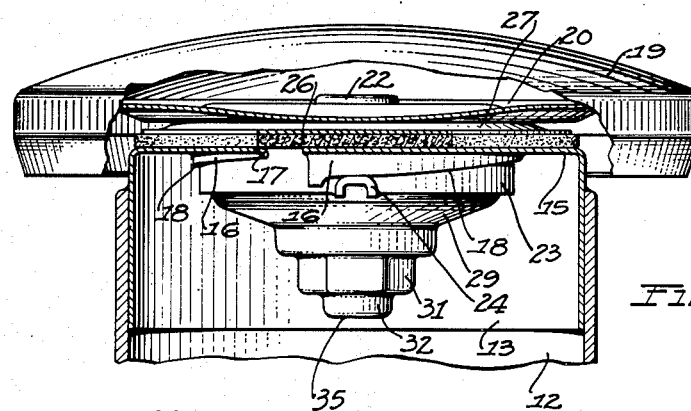
Fig. 2 is a sectional view of the same taken substantially on line 2—2 of Fig. 1.
Figure 3:
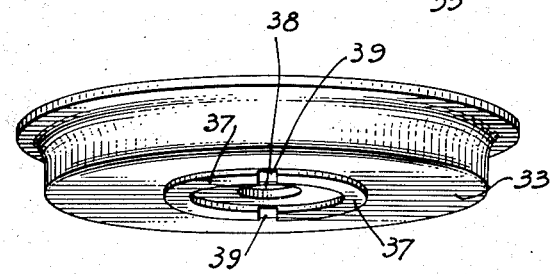
Fig. 3 is a perspective view of the valve seat element.

Referring now to the drawing by characters of reference, 10 indicates a liquid fuel storage tank associated with a system for feeding fuel to the engine of a motor vehicle in a conventional manner. The tank is formed with an inlet opening 11 which is surrounded by a filler neck structure consisting of partly telescoping tubes 12 and 13. The tube 12 has a base flange portion 14 which is suitably fixed to the tank, and the telescoping portions of the neck are also suitably secured in fixed relation. The outer end of the tube 13 is bent to form an end wall 15 from which a downwardly extending circular flange 16 extends. This flange is slotted as indicated at 17 and the edge portions thereof between the slots are in the form of cam surfaces indicated at 18.

A removable vented closure means is associated with the upper end of the filler neck and includes passage forming means having valve means therein allowing the escape of vapor but restricting the out-flow of liquid fuel. A cap is formed of two telescoping shells 19 and 20 having peripheral flanges suitably secured together and having the central portions spaced to provide a hollow chamber. In order to connect this chamber with atmosphere, there is an opening 21 through the shell 20.

Fixed to the central portion of the shell 20 by a rivet 22 is an inverted cup-like shell 23 having a pair of ears 24 extending outwardly from the open edge portion. The cup shell is arranged to telescope into the filler opening formed by the flange 16 and is similar in diameter relative thereto. The slots 17 in the filler tube 13 are disposed complementary to the ears 24 so that they can be moved through such slots when the cap structure is being applied or removed to the filler neck. By turning the cap structure, after it has been applied axially to the filler neck, the ears will ride on the cam surfaces 18 and will secure the cap structure so that it cannot become axially displaced.

A gasket 25 encircles a central portion of the closure structure, intermediate the cap shell and the cup-like shell, and another gasket 26 encircles the cup-like shell. Between these gaskets is arranged a circular diaphragm spring member 27, formed preferably of sheet metal. The gasket 26 engages the upper wall 15 of the filler neck structure and the cup-like shell and serves as a seal to prevent the passage of gas or liquid fuel from between the closure structure and the filler neck. An opening 28 extends through the abutting central portions of the shells 20 and 23 establishing communication between the under side of the shell 23 and the chamber between the telescoping cap shells.

Anti-splash means consisting of a cup member 29 and valve means is associated with the closure means. The open end of this cup member telescopes into the inverted shell and is suitably fixed in such relation that it forms a passage through which liquid and gas in the filler neck structure must pass in order to reach the passage 28 leading to the vented cap chamber. The lower end of the cup member is formed in different diameters to form sections 30, 31 and 32. The section 31 is irregular in cross sectional outline and is preferably hexagonal. The valve means is arranged in these sections of reduced diameter. A partition element 33 extends across the cup shell and is nested and fixed in the portion 30. Movable axially in the portion 31 of the cup shell is a flat fiber valve element 34 which is hexagonal in outline and slightly smaller in outline than the interior of the portion 31 of the cup shell. Between the valve member and the end wall 35 of the cup shell is arranged a light pressure coil spring 36 which normally holds the valve plate against a circularly disposed seat flange 37. This seat projects from the lower face of the partition and substantially surrounds an opening 38 extending axially through the partition. The valve seat is slotted as indicated at 39 to form passages between the opening 38 and the section 31 of the cup member even though the valve plate engages the seat. The bottom wall 35 of the cup shell is formed with an opening 40 establishing communication between the filler neck and the interior of the cup member.

When the closure means is locked on the filler neck structure, an open passage is established between the tank and atmosphere through the cover means by opening 40, slots 39, openings 38, 28 and 21. Any liquid fuel splashing or otherwise moving from the filler neck through the opening 40 must pass around the valve 34 to follow the same path as that taken by gas. As this valve is several times larger than the slots or the opening 38, very little liquid fuel gets above the partition 33 from splashing or tilting of the tank caused by vehicle sway either laterally or longitudinally. Any liquid fuel which does pass through the partition 33 has lost its force due to contact with the valve 34 and has a relatively slow movement into the upper part of the cup member 29. The opening 28 being small as compared with the cup member and located above the central portion of the cup member will substantially prevent flow of liquid fuel outwardly through opening 28. The fuel is thus substantially trapped in the cup member until the vehicle is level whereupon the fuel flows back into the neck structure through openings 38 and 40. As the spring 36 exerts a light pressure it can be readily drawn away from the seat to increase the volume of air moved into the system when the vacuum therein is high. When the valve is unseated the liquid fuel must pass therearound before entering the space above the partition and the escape of liquid fuel through the opening 38 is relatively small under such circumstance.

With the structure herein described vapor is free to move from the tank to atmosphere but escape of liquid fuel from the tank by the same route is substantially eliminated.

Although the invention has been described in connection with specific embodiments, the principles involved are susceptible of numerous other applications which will readily occur to persons skilled in the art. The invention is therefore to be limited only as indicated by the scope of the appended claims.

What I claim is:

1. In a closure cap for a tank filler neck, the combination with means forming a chamber having inlet and outlet passages through which vapor can escape to atmosphere from the neck, of a partition in the chamber having an opening therein and a slotted valve seat projecting beyond the opening, and a valve in the chamber cooperating with the valve seat restricting outflow of liquid fuel.

2. In a closure cap for a tank filler neck, the combination of a cup member having inlet and outlet openings through which vapor escapes from the neck, of valve means in the cup member comprising a partition between the inlet and outlet passages having an opening therein and a slotted valve seat extending beyond the opening, a plate valve member cooperative with the seat, and spring means in the cup member urging said valve against said seat.

3. In a closure cap for a tank filler neck, the combination with a cup member having a restricted closed end portion with an irregular cross sectional shape, the bottom wall of said member having an opening therethrough, of valve means in said cup member comprising a partition having an opening therethrough and a slotted valve seat extending from the bottom face around the opening, a plate valve member operable in the irregular shaped restricted portion of the cup member, said plate being shaped similar but smaller than the cup portion in which it operates, and a coil spring between the valve plate and the bottom wall of the cup member, said spring normally holding the valve plate against the seat.

4. In a closure for a tank neck comprising a cap formed of spaced telescoping shells, the inner shell having an outlet passage therethrough, a shell member fixed to the inner cap shell having a flange adapted to telescope into the tank neck, said inner cap shell and said shell member having aligned openings therein, a cup member having its open end telescoping into and sealed with the flange of said shell member, said cup member having an opening therein communicating with the tank neck, and valve means in the cup member restricting movement of fluid in the cup in a direction toward the opening aligning with the cap shell opening.

CHARLES J. SMITH.